United States Patent [19]
Fletcher et al.

[11] 3,926,567
[45] Dec. 16, 1975

[54] CERMET COMPOSITION AND METHOD OF FABRICATION

[76] Inventors: James C. Fletcher, Administrator of the National Aeronautics and Space Administration, with respect to an invention of; Wayne M. Phillips, La Crescenta, Calif.

[22] Filed: Apr. 5, 1973

[21] Appl. No.: 348,422

[52] U.S. Cl. ............................................. 29/182.5
[51] Int. Cl.² ........................................ C04B 35/70
[58] Field of Search ........ 29/182.5; 75/206; 106/55, 106/57, 58

[56] References Cited
UNITED STATES PATENTS

| | | | |
|---|---|---|---|
| 2,789,341 | 4/1957 | Youssov | 29/182.5 |
| 3,066,391 | 12/1962 | Vordahl | 29/182.5 |
| 3,321,285 | 5/1967 | Sowman | 29/182.5 |
| 3,369,877 | 2/1968 | Humenik | 29/182.5 |
| 3,526,485 | 9/1970 | Dawihl | 29/182.5 |
| 3,718,441 | 2/1973 | Landingham | 29/182.5 X |

*Primary Examiner*—Benjamin R. Padgett
*Assistant Examiner*—R. E. Schaffer
*Attorney, Agent, or Firm*—Monte F. Mott; Wilfred Grifka; John R. Manning

[57] ABSTRACT

Cermet composition particularly adapted for production of high temperature resistant cermet insulator bodies, especially applicable as cermet electrical insulator seals for thermionic diodes, comprising particles of a high temperature metal or metal alloy, preferably niobium or niobium-zirconium alloy particles or spheres, dispersed in and bonded to a continuous matrix of a ceramic oxide, preferably yttria or alumina, the resulting cermet composition having improved strength provided by the metal content, with high electrical resistance at least comparable to or greater than the electrical resistance of the pure ceramic oxide, and high thermal shock resistance. Process for producing the above cermet composition comprises mixing particles of a high temperature resistant metal or metal alloy, e.g. niobium, with a ceramic oxide powder, e.g. yttria, and providing a substantially homogeneous mixture thereof, forming such composition into a desired shape, vacuum sealing the resulting composition and sintering such composition under high pressure in a high temperature autoclave operation.

15 Claims, 4 Drawing Figures

CERMET COMPOSITION AND METHOD OF FABRICATION

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to production of cermet compositions wherein particles of a metal or metal alloy, are dispersed in a continuous matrix of a ceramic oxide or refractory metal oxide, and is particularly concerned with the production of cermet compositions of the above type, having high temperature electrical resistance and which are especially designed for use as cermet seals for thermionic diodes, and with novel procedure for producing such cermet compositions.

2. Description of the Prior Art

It is known to strengthen high temperature resistant metals by adding ceramic or refractory metal oxides thereto. Thus for example, it is known to strengthen tungsten by addition thereto of a small amount of thorium, to produce thoriated tungsten, e.g. consisting of about 98% tungsten and 2% thorium oxide. Similarly, it is known to strengthen nickel by producing a thoriated nickel containing about 2% thorium oxide. In these compositions the ceramic oxide, e.g. thoria, is dispersed in a matrix of the metal, e.g. tungsten or nickel.

The following patents are further illustrative of the prior art cermet compositions wherein a ceramic or refractory metal oxide is dispersed in a metal matrix.

U.S. Pat. No. 3,085,876 is directed to a process for dispersing a refractory metal oxide in metals, by coprecipitating a water insoluble compound of the metal and the refractory oxide, and oxidizing such metal compound followed by reducing the metal oxide to the corresponding metal.

Similar compositions in the form of a dispersion of refractory oxide particles in a metal matrix, and procedures for producing such compositions are disclosed in U.S. Pat. Nos. 3,507,630; 3,019,103 and 2,672,426.

With respect particularly to production of cermet bodies for use as seals for thermionic diodes, heretofore the pure ceramic material, for example yttria or alumina, was brazed to the pure metal, e.g. niobium. However, the presence of the brazing metal is an undesirable material and limits the temperature of application of such seals due to the fact that the brazing metal or alloy used is a relatively low melting point material, e.g. pure copper or alloys with yet lower melting points. Further, such brazed seals are characterized by relatively low thermal shock resistance and inferior strength, due to the presence of pure ceramic which is not intermixed with the metal, e.g. niobium.

DESCRIPTION OF THE INVENTION

It has now been found in accordance with the present invention, that cermet bodies, preferably and particularly having high temperature electrical insulation properties, as well as high strength and high thermal shock resistance, are provided, comprising particles of a metal or metal alloy, preferably niobium, or niobium-zirconium alloy, coated with and dispersed in a continuous matrix of a ceramic oxide, preferably yttria, yttria-zirconia mixtures or alumina.

Briefly, the above cermet compositions are produced by a process which comprises mixing particles of a high temperature resistant metal or metal alloy such as niobium, with a ceramic oxide powder and forming a substantially homogeneous mixture with a ceramic oxide layer around and substantially covering the respective discrete metal or metal alloy particles, forming the composition into a desired shape, vacuum sealing the resulting composition, and sintering at high temperature and high pressure, e.g. by autoclaving, the resulting vacuum sealed composition, to produce a cermet composition wherein the metal or metal alloy particles are dispersed in and bonded to a continuous matrix of the ceramic oxide.

In preferred practice a binder such as a wax is added first to the metal, e.g. niobium, or metal alloy particles or spheres followed by addition of the ceramic oxide powder, to aid in forming a homogeneous mixture in which a substantially uniform ceramic oxide layer is formed around the individual metal or metal alloy particles, such binder being removed prior to sintering by low temperature firing or heating.

Further, where the cermet body according to the invention is to be machined prior to final sintering, it is preferred, following formation of the homogeneous mixture of metal or metal alloy particles coated with ceramic oxide, to cold-press the composition into a desired shape, followed by partial sintering of the cold-pressed body, and then subjecting the resulting body in the partially sintered state, to the desired machining operation prior to final sintering.

The ceramic oxide or refractory oxide material which forms the matrix of the ceramic bodies produced according to the invention preferably are high temperature resistant metal oxides providing high electrical insulation. Preferred ceramic oxides for this purpose are alumina ($Al_2O_3$), yttria ($Y_2O_3$), zirconia ($ZrO_2$), and mixtures thereof. Combinations of yttria and zirconia, particularly a mixture of yttria and about 1 to about 20% by volume of zirconia, have also been found particularly effective. Zirconia ($ZrO_2$) in combination with another dissolved metal oxide such as calcium oxide or magnesium oxide, also provides high electrical insulation.

As previously noted, the cermet compositions of the invention preferably are designed as high temperature resistant electrical insulators, especially for use as seals for thermionic diodes. However, the cermet bodies according to the invention can have wide application and can be employed wherever a pure ceramic can be used, while at the same time providing the advantages of high strength and high thermal shock resistance. Other diverse applications include use of the cermet, for example, as medical implants, for rebuilding bones and joint structures of the body. For these various additional applications, alternative ceramic oxides can be employed such as titanium dioxide, tantalum oxide, vanadium oxide, niobium oxide and chromium oxide.

The metal particles or spheres which are dispersed in the ceramic matrix of the insulator bodies produced according to the invention include metal or metal alloy particles or spheres, preferably niobium or alloys of niobium containing a small amount of zirconium, aluminum or yttrium. Examples of such latter alloys are niobium-1% zirconium, niobium-1% yttrium and niobium-1% aluminum. Niobium and niobium-1% zirconium particles or spheres are preferred for their matching thermal coefficients with those of the preferred above-noted ceramic oxides, particularly alumina and yttria.

Particles or spheres of other metals or metal alloys also can be employed. Such alternative metals include for example, nickel, iron, chromium, cobalt, tantalum, tungsten, molybdenum, aluminum and magnesium. As previously noted, the various respective metals are preferably chosen in combination with a particular ceramic oxide so as to obtain matching coefficients of expansion. Thus for example, molybdenum particles or spheres can be employed with alumina or yttria as ceramic oxide.

The size of the metal or metal alloy particles or spheres is not critical, it being preferred however that such particles or spheres are reasonably uniform in size and shape. It is desirable that such particles or spheres not be too large in relation to the total thickness of the cermet body or insulator to be fabricated, for example such particles should be of a size not more than about 10% of the thickness of the cermet body or insulator. Thus, for example, the diameter of the particles or spheres of the metal or alloy can range from about 10 to about 1,000 microns, particles of about 25 to about 100 micron size usually being employed.

It is desirable that the size of the particles of the ceramic oxide by substantially less than the size of the metal or metal alloy particles. Preferably the size of the ceramic oxide particles is less than 1/10 the diameter of such metal or metal alloy particles. Thus, where for example 100 micron size metal or metal alloy particles are employed, less than 10 micron size ceramic oxide particles should be employed. Usually the ceramic oxide particles are of a size ranging from about 0.01 to about 0.05 the diameter of the metal particles or spheres.

The proportions of metal particles or spheres, to ceramic oxide powder can vary. The greater the proportion of metal particles to ceramic oxide, the better the mechanical properties, particularly tensile strength. However, the amount of metal particles employed should not be so great as to lower substantially the electrical insulating properties of the ceramic body, particularly where such bodies are to be employed as seals for thermionic diodes. Thus for example, up to 80% by volume of the metal particles or spheres can be present in the composition, provided the coating technique for coating such particles with the ceramic technique for coating such particles with the ceramic oxide powder is sufficiently effective to provide a uniform coating of the ceramic around the metal or metal alloy particles. Generally, from about 5 to 80%, preferably about 25 to about 60%, by volume of metal or metal alloy particles or spheres, and about 20 to about 95%, preferably about 40 to about 75%, by volume of ceramic oxide powder, are present in the mixture or composition of these two components.

In preferred practice, although not necessarily, prior to mixing the metal or metal alloy spheres with the ceramic oxide powder, a binder is added to such particles or spheres to aid in obtaining a more uniform coating of the ceramic oxide powder on the metal particles or spheres, and a more uniform dispersion of such particles within the ceramic oxide matrix. Preferred binders for this purpose are any suitable wax, for example, paraffin wax, carnauba wax or beeswax, paraffin wax being found particularly effective. Preferably, the wax is applied warm, that is in melted condition, to the metal or metal alloy particles, to uniformly coat the particles with the binder. This can be conveniently accomplished by warm ball milling the metal particles or spheres with the wax.

Although not as desirable, alternative binders also can be employed, such as polyvinyl alcohol, aqueous soap solution, amyl acetate, butyl acetate, and nitrocellulose diluted with butyl alcohol.

Usually, only sufficient binder is employed to obtain a thin layer or coating of the binder on the metal or metal alloy particles. The amount of binder generally employed to achieve this result can range from about 2 to about 10% by volume of the mixture of metal or metal alloy particles, and binder.

If desired, a small amount of binder also can be added to the ceramic oxide powder, in addition to adding the binder to the metal particles, as described above, prior to mixing such metal or metal alloy particles with the ceramic oxide binder. However, usually the addition of the binder to the ceramic oxide powder is not necessary, where as in preferred practice, the binder is added to the metal or metal alloy particles. It will be understood of course that this procedure can be varied depending on the particular ceramic oxide and the particular metal or metal alloy particles employed. However, as previously noted, the binder can be omitted entirely in practice of the invention process.

The metal or metal alloy particles, preferably coated with a binder such as paraffin, as noted above, is then mixed with the ceramic oxide under conditions to obtain a homogeneous mixture of metal or metal alloy particles or spheres, uniformly coated with the ceramic oxide powder. Where a binder such as paraffin has been employed, the resulting mixture of metal alloy particles and ceramic oxide is initially heated at elevated temperature sufficient to decompose and remove such wax binder. Thus, for example, where paraffin wax is employed as binder, the above-noted mixture is heated to about 400°C in a vacuum to remove the paraffin binder. Usually such initial heating for removal of the binder can be accomplished at temperature ranging from about 200° to about 500°C, for a period ranging from about 1 to about 8 hours. Where other binders such as polyvinyl alcohol are employed, lower heating temperatures can be employed to remove such binders.

The mixture of metal particles and ceramic oxide then can be formed into a desired shape such as by placing the mixture in a suitable container or mold, which is sealed as by welding under vacuum. Vacuum sealing is required prior to subsequent sintering under high pressure, in order to avoid entrapment of air bubbles which can cause an inferior bond between the metal or metal alloy particles and the ceramic oxide interfaces.

The above noted forming operation can be accomplished without prior pressing of the mixture, but increased density of the final cermet body can be achieved by pressing the metal particle-cermet oxide mixture into a desired shape. When a binder is employed and such pressing operation is utilized, the binder is removed by heating as noted above, following such pressing operation. The pressed mixture is then placed in a suitable container or housing and vacuum sealed as noted above.

The resulting vacuum sealed cermet body is then subjected to final firing or sintering at high temperature and pressure to produce the high temperature and shock resistant cermet insulator body according to the invention. This is effectively accomplished by placing the shaped mixture or body composed of the metal or metal alloy particles distributed in and coated with the ceramic oxide, in an autoclave for carrying out a high pressure, high temperature autoclaving operation. This operation is generally carried out at temperature ranging from about 1,000° to about 2,000°C, usually about 1,400° to about 1,800°C, depending upon the particular metal or metal alloy particles, and the particular ceramic oxide materials employed. This is an essential step in the procedure for fabricating the cermet body of the invention. Depending again upon the particular metal particles and ceramic oxide of which the cermet body is composed, a suitable combination of pressure and temperature as a function of time is utilized to obtain a final cermet body having the desired high strength, shock resistance and electrical resistance. Genrally pressures during the final sintering operation or autoclaving, can range from about 2,000 to about 15,000 psi, usually from about 5,000 to about 12,000 psi. Time for final sintering or autoclaving generally can range from about 3 to about 15 hours for the entire operation, with the time period during application of maximum temperature and maximum pressure during such operation, for example maximum temperature of 1,500°C and maximum pressure of 10,000 psi, ranging from about 3 to about 4 hours. After such sintering, the sintered cermet body is removed from the sintering atmosphere, and the vacuum seals are removed.

During the final sintering operation at high pressure, or the autoclave operation, diffusion bonding occurs between the metal or metal alloy particles or spheres, and the ceramic oxide matrix surrounding such particles or spheres, forming a strong bond between such particles or spheres and the ceramic oxide matrix, resulting in a high strength interfacial bond between such particles and the ceramic oxide matrix, and a cermet body of correspondingly high strength. The exposed particles or spheres of metal at the surfaces of the body form metallic anchors which extend into the cermet structure so that metallic members which may be attached to the cermet body as described in greater detail below, and which may have the same composition as the metal particles of the cermet body, such as niobium, are more readily anchored to the cermet body by means of the strong interfacial bond between such exposed particles at the surface of the cermet body and the adjacent metal members.

As a further feature of the invention, it has been found that an interfacial bond of improved mechanical strength between the metal particles or spheres and the ceramic oxide matrix can be achieved by selecting metal or metal alloy particles or spheres and ceramic oxide materials so as to obtain at least a limited chemical reaction between such metal or metal alloy spheres and the ceramic oxide, thereby to achieve a higher strength cermet body. Thus for example this can be accomplished by adding a minor portion of zirconium oxide to yttria, in combination with the use of a niobium-zirconium alloy, thereby causing a reaction between the zirconium content of the metal alloy particles, and the zirconium oxide content of the ceramic oxide mixture. A similar result can be accomplished employing for example a niobium alloy containing yttrium, e.g. 1% yttrium, and pure yttria as the ceramic oxide. In this combination, the yttrium metal content of the metal alloy particles reacts with the yttrium oxide ceramic. Similarly, when employing alumina as the ceramic oxide, a niobium alloy of aluminum, e.g. containing 1% aluminum particles or spheres, can be utilized, for reaction of the aluminum metal content of the alloy particles with the alumina.

Where it is desired to machine the cermet body or part prior to carrying out the final high pressure, high temperature sintering or autoclaving operation, the above-described procedure preferably is varied in the following manner. After mixing the metal or metal alloy particles, preferably coated with a binder such as paraffin wax, and the ceramic oxide powder, so as to thoroughly and uniformly coat the metal particles or spheres with the ceramic oxide, such mixture is first pressed into a desired shape. This operation can be accomplished by means of cold-pressing, at pressures which can range from about 5,000 to as high as about 100,000 psi, e.g. at 60,000 psi, such pressure varying with the particular metal particles employed and other factors such as the particular manner of coating such particles with the ceramic oxide.

Following such cold-pressing operation, the binder, e.g. paraffin wax, is removed by low temperature firing in a vacuum, as described above, e.g. at about 400°C, and thereafter the pressed body is subjected to an initial firing or presintering operation to achieve a partial sintering of the pressed body. Such presintering is carried out at temperatures generally ranging from about 600° to about 1,200°C, usually between about 800° and about 1,200°C, for a period which can range from about 2 to about 6 hours.

The above-noted combination of pressing or cold-pressing, and presintering are particularly preferred for rendering the cermet body machinable so that such body readily can be formed into the final desired shape by standard machining operations, prior to final sintering. Also such combination of pressing and presintering aids in increasing the tensile strength of the cermet by exposing more of the metal particles at the surface of the cermet body, for bonding with the metal interfaces of metal parts to be attached to the cermet body, as described above and more fully below.

The resulting machined initially pressed and presintered body is then placed in a suitable container and vacuum sealed as noted above, subjected to high pressure, high temperature final sintering or autoclaving in the manner described above, to produce the final cermet body containing a continuous matrix of the ceramic or ceramic oxide, having substantially uniformly dispersed or distributed therein, the metal or metal alloy particles or spheres.

The cermet body produced according to the invention has high strength, corresponding to a tensile strength generally ranging from about 4,000 to about 20,000 psi. The cermet body of the invention has high temperature resistance which can range generally from about 1,000 to about 1,500°C or higher, depending in large measure on the composition of the metal particles and of the ceramic oxide employed. The cermet body hereof also has high electrical insulation effectiveness. For example, a cermet body formed of an alumina matrix containing particles of niobium distributed therein has an electrical insulation effectiveness of 50 megohm-cms at 1,000°C. The electrical insulation effectiveness increases at lower temperatures, for example the above-noted alumina-niobium cermet body has an electrical insulation effectiveness greater than 500 megohm-cms at room temperature. The electrical insulation effectiveness for the various cermet bodies of the invention at about 1,000°C can range from about 1 to about 100 megohm-cms. It is unexpected and noteworthy that the addition of a small amount of metal in the form of the metal or metal alloy particles or spheres employed herein, to the ceramic oxide, results in actually increasing the electrical resistance of the resulting cermet body, over the electrical resistance of the pure ceramic oxide.

The cermet bodies of the invention comprising the metal particles or spheres dispersed in the continuous matrix of ceramic oxide, have substantially the same proportions of metal or metal alloy particles or spheres, and ceramic oxide, as contained in the original starting mixture of these components noted above for producing the cermet bodies of the invention. It is significant that the mechanical strength of the cermet bodies of the invention increases with an increase in metal content, the amount of such metal being limited as noted above so as not to materially reduce the high temperature electrical insulating properties of the cermet.

The invention will be more clearly understood in connection with the description below of the fabrication of cermet seals for thermionic diodes, taken in connection with the accompanying drawings wherein.

Figure 1:
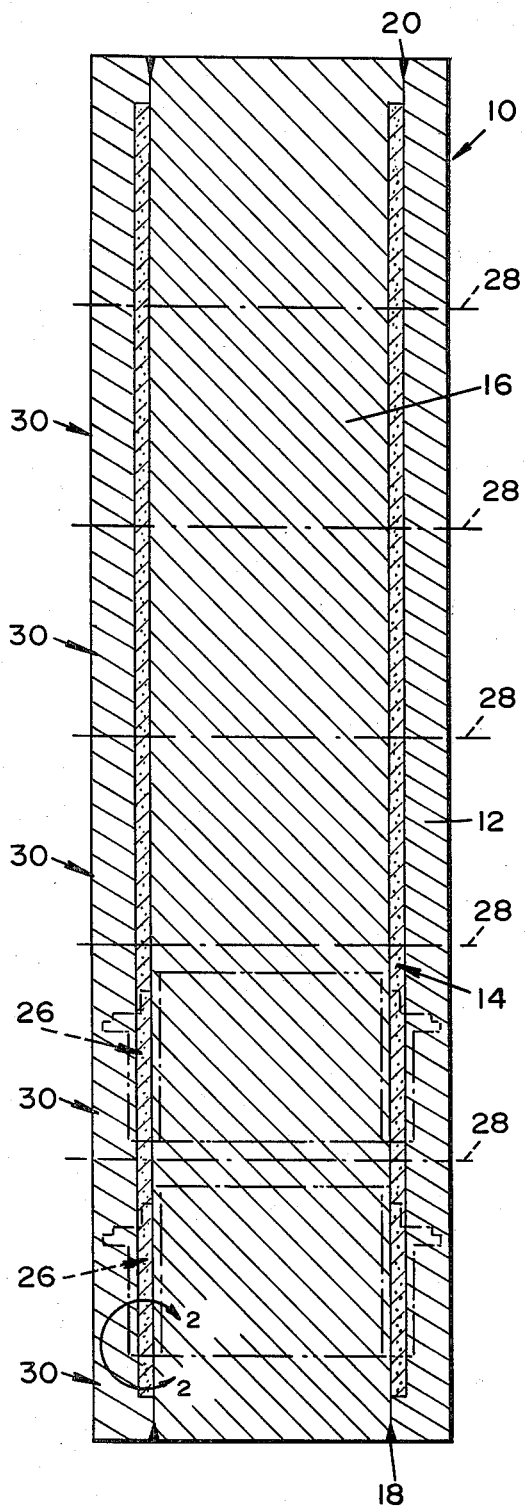
FIG. 1 shows the production of a bonded trilayer assembly comprising an outer solid metal layer or sleeve, disposed around an intermediate layer of cermet insulator body according to the invention, which in turn is positioned around an inner layer or solid rod of the same metal as the outer layer, e.g. niobium, and showing in dotted lines a cermet seal machined from such assembly.

Referring to FIG. 1 of the drawing, the trilayer assembly 10 shown therein consists basically of an outer solid layer or sleeve 12 positioned around a second or intermediate layer in the form of a cylinder 14 of a cermet body which receives within such cylinder a solid rod of metal 16.

For producing the cermet cylinder 14, metallic or metal alloy particles or spheres can be coated with a binder mixed with ceramic oxide powder as described above, followed by screening if desired, to obtain a uniform coating of the cermaic oxide powder around the individual particles or spheres, as described above. The resulting mixture of the metallic spheres coated with ceramic oxide is then cold-pressed on suitable mandrels to form thick-walled cylinders of the approximate diameter required, corresponding roughly to cylinder 14 in FIG. 1.

After removal of the mandrels, the binder is removed by low temperature firing in a vacuum as previously described. Following removal of the binder, the pressed cylinder is subjected to additional firing or presintering to achieve partial sintering as described above. In such partially sintered state, the thick-walled cylinder of pressed metal particles coated with ceramic oxide is readily machined to form a thin-wall cylindrical configuration corresponding more closely in dimensions to cylinder 14 of FIG. 1.

Machining of the partially sintered cylinder exposes some of the metal particles or spheres, e.g. niobium, at the interior and exterior surfaces of the cylinder.

After the cylinder is partially sintered, a metal rod 16, e.g. of niobium, is inserted in the cylinder indicated at 14, following which a metal sheath or sleeve 12, e.g. also of niobium, is slipped over cylinder 14 to form the trilayer assembly shown in FIG. 1. The resulting unit 10 is then welded at opposite ends, as indicated at 18 and 20, under vacuum, e.g. employing electron beam welding in a vacuum chamber.

Figure 2:
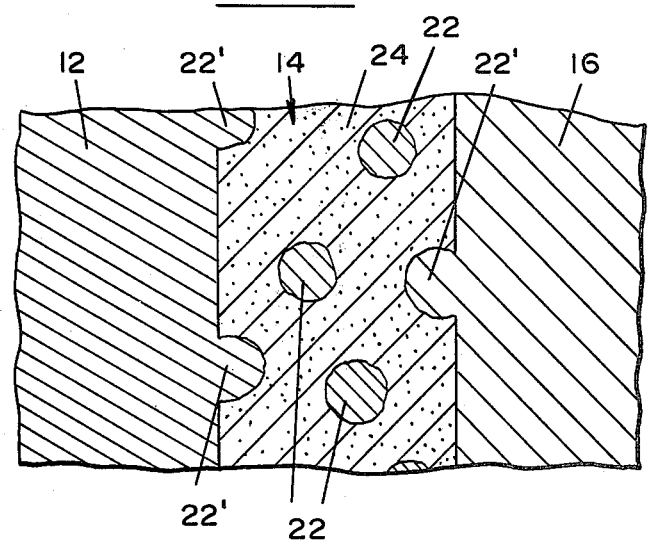
FIG. 2 illustrates the bonding of the metal particles of a cermet body according to the invention to adjacent metal, e.g. niobium layers, through the bonding of exposed metal spheres of the cermet to the adjacent metal layers, taken on line 2—2 of FIG. 1, such illustration being exaggerated for greater clarity.

The resulting sealed unit is placed in an autoclave and subjected to high pressure and high temperature sintering as described above to effect diffusion bonding between the ceramic oxide matrix, e.g. yttria, illustrated at 24 in FIG. 2 of the drawing, and the metal particles 22, e.g. niobium, as described above. In addition, diffusion bonding also occurs between the exposed metal or niobium particles 22' of the cermet body or layer 14 and the adjacent niobium layers 12 and 16, which increases the mechanical strength at the interfaces of the cermet body 14 and the adjacent metal or niobium layers 12 and 16.

Figure 3:
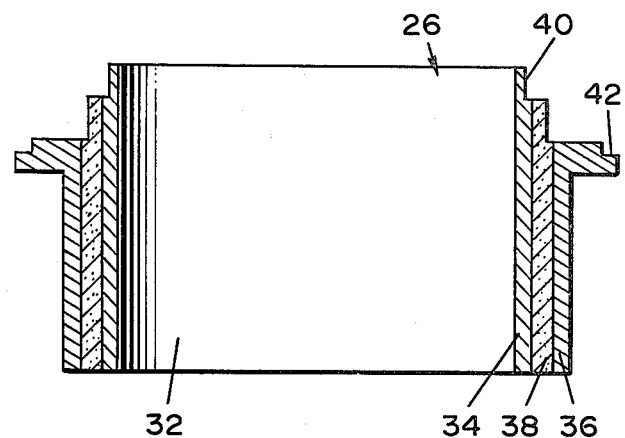
FIG. 3 illustrates a seal for a thermionic diode machined from the trilayer assembly of FIG. 1, and having an outer layer and an inner layer of high temperature resistant metal such as niobium bonded to an intermediate layer of cermet body according to the invention.

Individual cermet seals for thermionic diodes, indicated at 26 in dotted lines in FIG. 1 and in full lines in FIG. 3, are machined from the trilayer assembly 10, following the high pressure sintering operation. For this purpose the trilayer assembly 10 is cut as indicated in dotted lines 28 into individual sections indicated at 30 in FIG. 1, and each section 30 is machined to provide a central bore 32 forming an inner cylindrical metal layer 34, and the resulting assembly is further machined to provide the outer cylindrical metal layer 36 and the intermediate cermet high temperature electrically insulating cylindrical layer 38, the interior layer 34 being provided with a longitudinally outward extending first welding flange 40 and the outer metal layer 36 being provided with a laterally extending second welding flange 42. The resulting machined cermet seal 26 can be incorporated into a thermionic diode assembly (not shown) by suitable attachment and welding of flanges 40 and 42 to the thermionic diode assembly in known manner.

The following are examples of practice of the invention.

EXAMPLE 1

Niobium spheres 0.002 inches (50 microns) in diameter were mixed with 2% by volume of the total composition, paraffin wax, and the mixture was subjected to warm ball milling at a temperature of about 100°C.

To the resulting mixture of niobium spheres coated with paraffin wax was added alumina powder of about 1 micron particle size, employing an equal volume of alumina and paraffin coated niobium spheres. The ball milling operation was continued until a homogeneous mixture of the niobium spheres coated with the alumina was obtained.

The resulting ball milled mixture was then heated to about 400°C in vacuum for a period of about 4 hours to remove the paraffin binder. The resulting mixture was then placed in a suitable container which was then sealed from the ambient atmosphere by welding under vacuum.

The sealed homogeneous mixture of the niobium spheres coated with and dispersed in the alumina was placed in an autoclave and sintered therein at 1,500°C and at pressure of 10,000 psi for 3 hours.

The resulting cermet body has about 10,000 psi tensile strength, a temperature resistance ranging from about 1,000° to about 1,500°C, and an electrical insulation effectiveness at 1,000°C of about 25 megohm-cms.

EXAMPLE 2

The procedure of Example 1 was repeated except that prior to initial heating to remove the paraffin binder, the mixture of niobium spheres coated with the paraffin wax and the alumina powder, was pressed into a desired shape at a pressure of 60,000 psi. Thereafter, the paraffin binder was removed by heating at about 400°C as in Example 1, followed by partial sintering of the resulting mixture at about 1,000°C for about 3 hours.

The partially sintered cermet body was then machined to a desired shape and placed in a container composed of niobium-1% zirconium metal, and the container was sealed by welding under a vacuum.

The resulting sealed and partially sintered cermet body was placed in an autoclave and subjected to treatment as in Example 1, at 1,500°C and 10,000 psi pressure for a period of 3 hours.

The sealed cermet body was then removed from the autoclave and the welding seals removed by suitable machining.

The resulting cermet body had a tensile strength of about 15,000 psi, a high temperature electrical resistance of about 25 megohm-cms at 1,000°C, temperature resistance ranging from about 1,000 to about 1,500°C and had high thermal shock resistance.

EXAMPLE 3

Niobium-1% zirconium alloy spheres, about 0.001 inches (25 microns) in diameter was mixed with carnauba wax in an amount of about 3% by volume of the total composition, and the resulting mixture subjected to warm ball milling at about 100°C.

A mixture of yttria and zirconia, the latter in an amount of 3% by volume of the total mixture of yttria and zirconia, having a particle size of about 1 micron, was mixed with the niobium-zirconium metal spheres, in a proportion of 30% of the metal spheres and 70% of the ceramic oxide (yttria and zirconia) mixture, by volume. Ball milling of this mixture was continued at about 100°C to obtain a homogeneous mixture.

The mixture was then cold-pressed on mandrels at pressure of about 30,000 psi to form thick-walled cylinders of the approximate diameter required. After removal of the mandrels, the carnauba wax binder was removed at 400°C in vacuum.

Following binder removal, additional heating was carried out at temperature of 1,200°C for about 4 hours to achieve partial sintering. In the partially sintered state, the thick-walled cylinders were machined to a thinner wall configuration of the desired dimensions.

A metal rod composed of niobium-1% zirconium alloy of a diameter corresponding to the approximate internal diameter of the partially sintered cermet cylinder was inserted therein, and a sleeve composed of niobium-1% zirconium alloy, having an internal diameter approximately equal to the external diameter of the partially sintered cermet cylinder was placed thereover, to form a trilayer assembly corresponding to the trilayer assembly 10 in FIG. 1 of the drawing.

Figure 4:
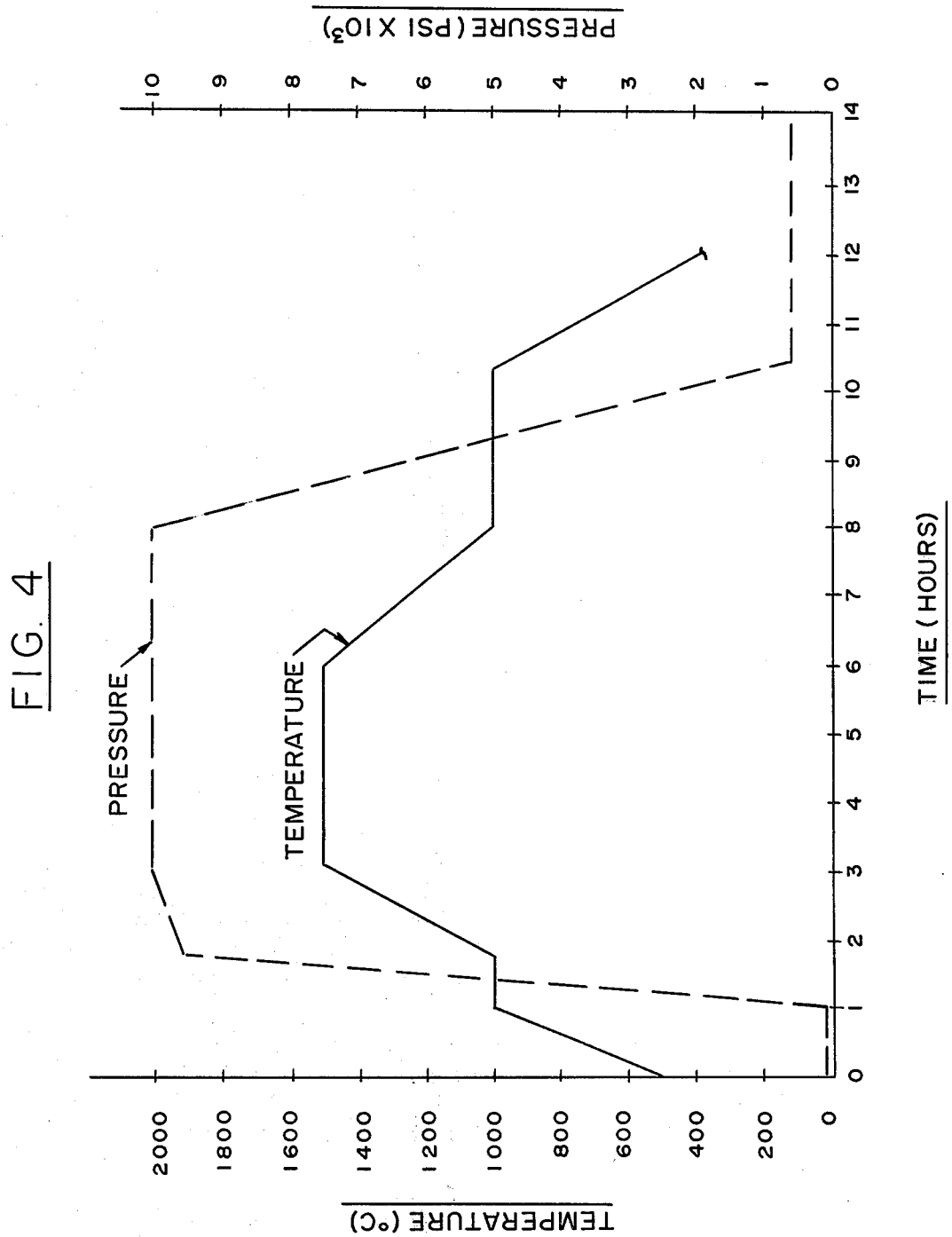
FIG. 4 illustrates the pressure and temperature conditions during final firing or autoclaving of a typical cermet body according to the invention, and which can be carried out on the trilayer assembly of FIG. 1, prior to machining of such assembly to produce the cermet seal of FIG. 3.

Such trilayer assembly was then placed in an autoclave and subjected to heating therein under temperature and pressure conditions as a function of time, as shown in FIG. 4 of the drawing. As seen in FIG. 4, the trilayer assembly was subjected to maximum temperature of 1,500°C and a maximum pressure of 10,000 psi for a period of about 4 hours, the total autoclaving operation taking place over a period of about 12 hours.

The resulting unit was then removed from the autoclave and machined into individual electrical insulator seals for diodes, shown at 26 in FIG. 3 of the drawing. Such seals had a tensile strength of 8,000 psi, an electrical resistance of about 10 megohm-cms at 1,000°C, temperature resistance ranging from about 1,000 to about 1,200°C and high thermal shock resistance.

EXAMPLE 4

The procedure of Example 3 is followed except employing in place of the yttria-zirconia ceramic oxide mixture of Example 3, the same amount of pure yttria.

The resulting cermet seals thus produced, although having comparable electrical resistance, temperature resistance and high thermal shock resistance, as in the case of the seals of Example 3, had a reduced tensile strength of between about 4500 and 5,000 psi.

EXAMPLE 5

The procedure of Example 3 was followed except employing niobium-1% yttrium metal alloy spheres and pure yttria as the ceramic oxide, in place of and in the same amounts and particle sizes as the niobium-1% zirconium alloy spheres and yttria-zirconia ceramic oxide mixture of Example 3.

The resulting cermet seals thus produced have comparable properties of electrical resistance, temperature resistance and high thermal shock resistance, as well as tensile strength of the order of 8,000 psi, as in the case of the cermet seals of Example 3.

Example 3 and 5 above show that when metal alloy particles or spheres are used having a small amount of a metal such as zirconium or yttrium, corresponding to the metal of at least one of the metal oxides of the ceramic oxide employed, such as zirconia or yttria, the resulting cermet bodies produced have enhanced or increased strength, as result of reaction between such metal spheres and ceramic oxides having such common metal, whereas according to Example 4, it is noted that when this is not the case, that is, where the ceramic oxide was pure yttria containing no zirconia, and no reaction between the zirconium metal of the metal alloy spheres and the yttria occurs, the strength of the resulting cermet bodies is reduced.

EXAMPLE 6

The procedure of Example 3 was followed except that the proportion of niobium-1% zirconium alloy spheres, and the ceramic oxide (yttria and zirconia) mixture, was 50% of the metal alloy spheres and 50% of the ceramic oxide mixture, by volume.

With the above-noted higher proportion of metal alloy to ceramic oxide as compared to the 30% by volume proportion of Example 3, the resulting cermet seals had a higher tensile strength of about 10,000 psi, as compared to the 8,000 psi tensile strength of the seals of Example 3, while having electrical resistance, temperature resistance and high thermal shock resistance similar to the cermet seals produced in Example 3.

From the foregoing, it is seen that the invention provides procedure for readily producing from commercially available materials, high temperature resistant cermet insulator bodies particularly applicable for use as cermet electrical insulation seals for thermionic diodes, having improved strength, and high thermal shock resistance.

While I have described particular embodiments of the invention for purposes of illustration, it will be understood that various changes and modifications can be made therein within the spirit of the invention, and the invention accordingly is not to be taken as limited except by the scope of the appended claims.

1. A high strength cermet composition comprising a sintered body consisting of high temperature resistant metal or metal alloy particles coated with and dispersed in a continuous matrix of ceramic oxide, said metal or metal alloy particles comprising two different metals, one of said metals being present in a small amount, said last mentioned metal corresponding to the metal of at least one metal oxide of said ceramic oxide.

2. A cermet composition as defined in claim 1, said body being compressed and sintered.

3. A high strength cermet composition comprising a sintered body consisting of high temperature resistant metal or metal alloy particles coated with and dispersed in a continuous matrix of ceramic oxide, said metal and metal alloy particles being selected from the group consisting of niobium, niobium alloys containing a small amount of metal of the group consisting of zirconium, aluminum and yttrium; nickel, iron, chromium, cobalt, tantalum, tungsten, molybdenum, aluminum and magnesium, said ceramic oxide being selected from the group consisting of alumina, yttria, zirconia, and mixtures thereof, zirconia in combination with an oxide of the group consisting of calcium oxide and magnesium oxide; titanium dioxide, tantalum oxide, vanadium oxide, niobium oxide and chromium oxide.

4. A high strength cermet composition comprising a sintered body consisting of high temperature resistant metal or metal alloy particles coated with and dispersed in a continuous matrix of ceramic oxide, said metal or metal alloy particles being selected from the group consisting of niobium and niobium alloys containing a small amount of a member selected from the group consisting of zirconium, aluminum and yttrium, and said ceramic oxide being selected from the group consisting of alumina, yttria, zirconia, and mixtures thereof.

5. A cermet composition as defined in claim 3, said metal or metal alloy particles being present in an amount ranging from about 5 to about 80%, and said ceramic oxide being present in an amount ranging from about 20 to about 95%, by volume.

6. A cermet composition as defined in claim 4, said metal or metal alloy particles being present in an amount ranging from about 5 to about 80%, and said ceramic oxide being present in an amount ranging from about 20 to about 95%, by volume.

7. A cermet composition as defined in claim 4, said metal or metal alloy particles being present in an amount ranging from about 25 to about 60%, and said ceramic oxide being present in an amount ranging from about 40 to about 75%, by volume.

8. A cermet composition as defined in claim 6, said metal or metal alloy particles having a diameter ranging from about 10 to about 1,000 microns, said ceramic oxide being in the form of particles of a size less than 1/10 the diameter of said metal or metal alloy particles.

9. A cermet composition as defined in claim 4, employing said niobium alloy particles containing said small amount of said metal corresponding to the metal of at least one metal oxide of said ceramic oxide.

10. A cermet composition as defined in claim 7, comprising a pressed sintered body consisting of particles of a member selected from the group consisting of niobium, niobium-1% zirconium, niobium-1% yttrium and niobium-1% aluminum, said particles homogenously distributed in a continuous matrix of said ceramic oxide, said metal or metal alloy particles having a diameter ranging from about 10 to about 1,000 microns, said ceramic oxide being in the form of particles of a size less than 1/10 the diameter of said metal or metal alloy particles.

11. A cermet composition as defined in claim 10, said ceramic oxide being a mixture of yttria and from 1 to about 20% of zirconia, by volume of such mixture.

12. A cermet composition as defined in claim 11, said particles being niobium-1% zirconium alloy, said particles having a diameter ranging from about 25 to about 100 microns and said ceramic oxide particles being of a size ranging from about 0.01 to about 0.05 the diameter of said metal alloy particles.

13. A cermet composition as defined in claim 10, said particles being niobium-1% yttrium alloy and said ceramic oxide being yttria, said particles having a diameter ranging from about 25 to about 100 microns and said ceramic oxide particles being of a size ranging from about 0.01 to about 0.05 the diameter of said metal alloy particles.

14. A cermet composition as defined in claim 10, said particles being niobium-1% aluminum alloy and said ceramic oxide being alumina, said particles having a diameter ranging from about 25 to about 100 microns and said ceramic oxide particles being of a size ranging from about 0.01 to about 0.05 the diameter of said metal alloy particles.

15. A cermet composition as defined in claim 10, said particles being niobium-1% zirconium alloy and said ceramic oxide containing zirconia, said particles having a diameter ranging from about 25 to about 100 microns and said ceramic oxide particles being of a size ranging from about 0.01 to about 0.05 the diameter of said metal alloy particles.

* * * * *